(No Model.) 5 Sheets—Sheet 2.

T. GRIFFITHS.
CONVERTER.

No. 295,544. Patented Mar. 25, 1884.

Witnesses:
W. B. Corwin
Jno. K. Smith

Inventor
Thomas Griffiths
by his attys
Bakewell & Kerr (No Model.) 5 Sheets—Sheet 3.

T. GRIFFITHS.
CONVERTER.

No. 295,544. Patented Mar. 25, 1884.

Witnesses
Inventor
Thomas Griffiths
by his attys
Bakewell & Kerr (No Model.) 5 Sheets—Sheet 4.

T. GRIFFITHS.
CONVERTER.

No. 295,544. Patented Mar. 25, 1884.

Witnesses:
M. A. Corwin
Jno. K. Smith

Inventor
Thomas Griffiths
by his attys
Bakewell & Kerr (No Model.) 5 Sheets—Sheet 5.

T. GRIFFITHS.
CONVERTER.

No. 295,544. Patented Mar. 25, 1884.

Witnesses
W. B. Corwin
Jno. K. Smith

Inventor
Thomas Griffiths
by his attys
Bakewell & Kerr

UNITED STATES PATENT OFFICE.

THOMAS GRIFFITHS, OF ABERGAVENNY, COUNTY OF MONMOUTH, ENGLAND.

CONVERTER.

SPECIFICATION forming part of Letters Patent No. 295,544, dated March 25, 1884.

Application filed October 15, 1883. (No model.) Patented in England March 22, 1883, No. 1,509.

*To all whom it may concern:*

Be it known that I, THOMAS GRIFFITHS, a subject of the Queen of Great Britain, residing at Abergavenny, in the county of Monmouth, England, have invented certain new and useful Improvements in Converters, (for which I have received Letters Patent in Great Britain, No. 1,509, dated March 22, 1883,) of which the following is a specification.

The invention has for its object improvements in means or apparatus employed in the manufacture of iron and steel.

In the specification of Letters Patent granted to William John Clapp and myself, dated February 6, 1883, No. 271,683, was described a method of closing and opening the passage through the tuyeres by means of plugs or stoppers formed to fit seats at the rear ends of the tuyeres, such plugs or stoppers being provided with pistons fitting cylinders, which pistons were acted upon in one direction to force the plugs or stoppers against their seats to close the tuyeres, and in the other direction to remove the plugs or stoppers from their seats, and thereby open the passage through the tuyeres. According to my present invention, I dispense with the use of plugs, pistons, and cylinders, for closing the passage through the tuyeres, and I afford facility for repairing or renewing the blocks, which receive the tuyeres, from the outside of the converter, thereby avoiding the necessity which hitherto existed for cooling the converter, and for repairing the same from the interior thereof; and in order that my present invention may be clearly understood and readily carried into effect, I will proceed, aided by the accompanying drawings, fully to describe the same.

Figure 1:
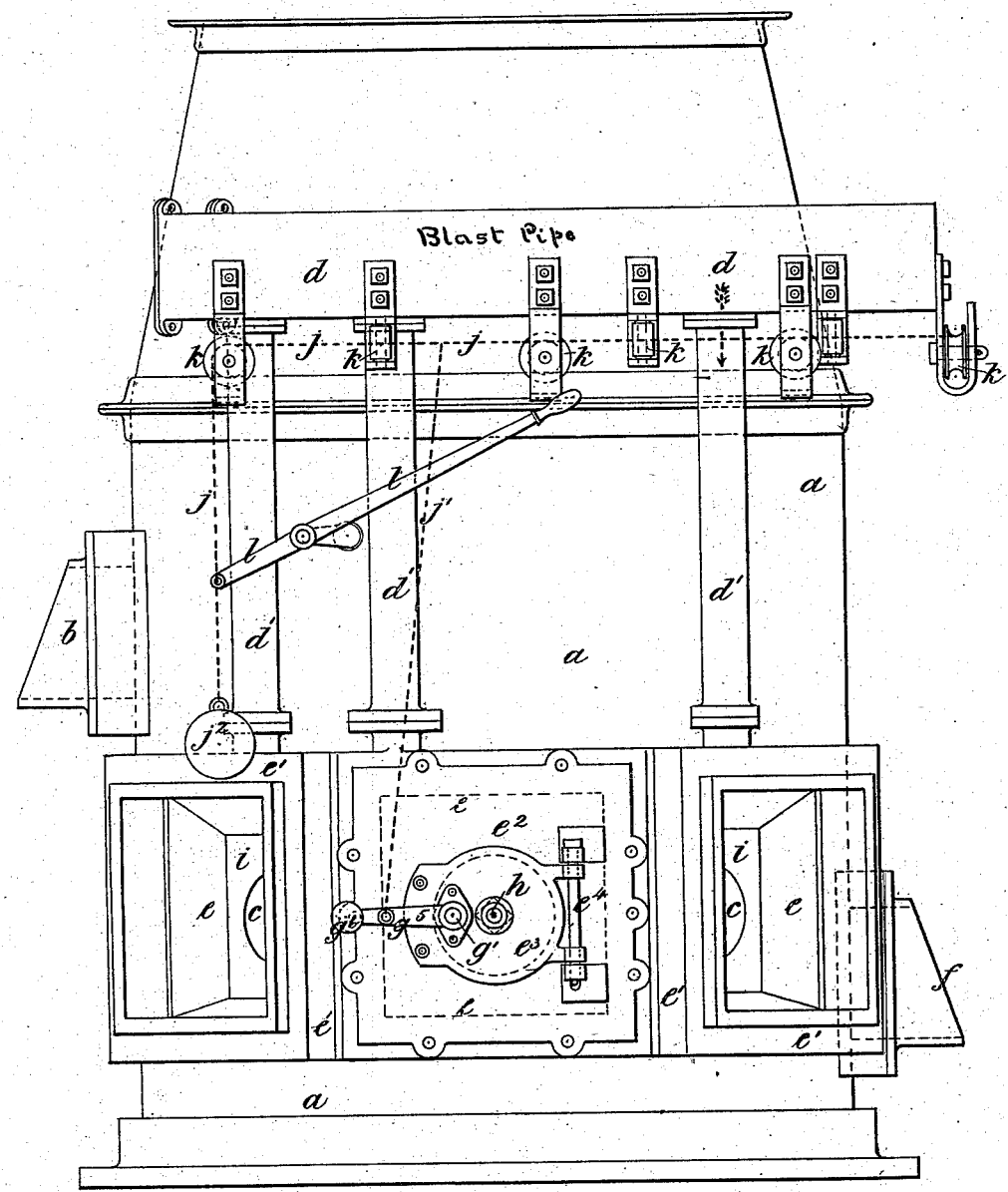
Figure 2:
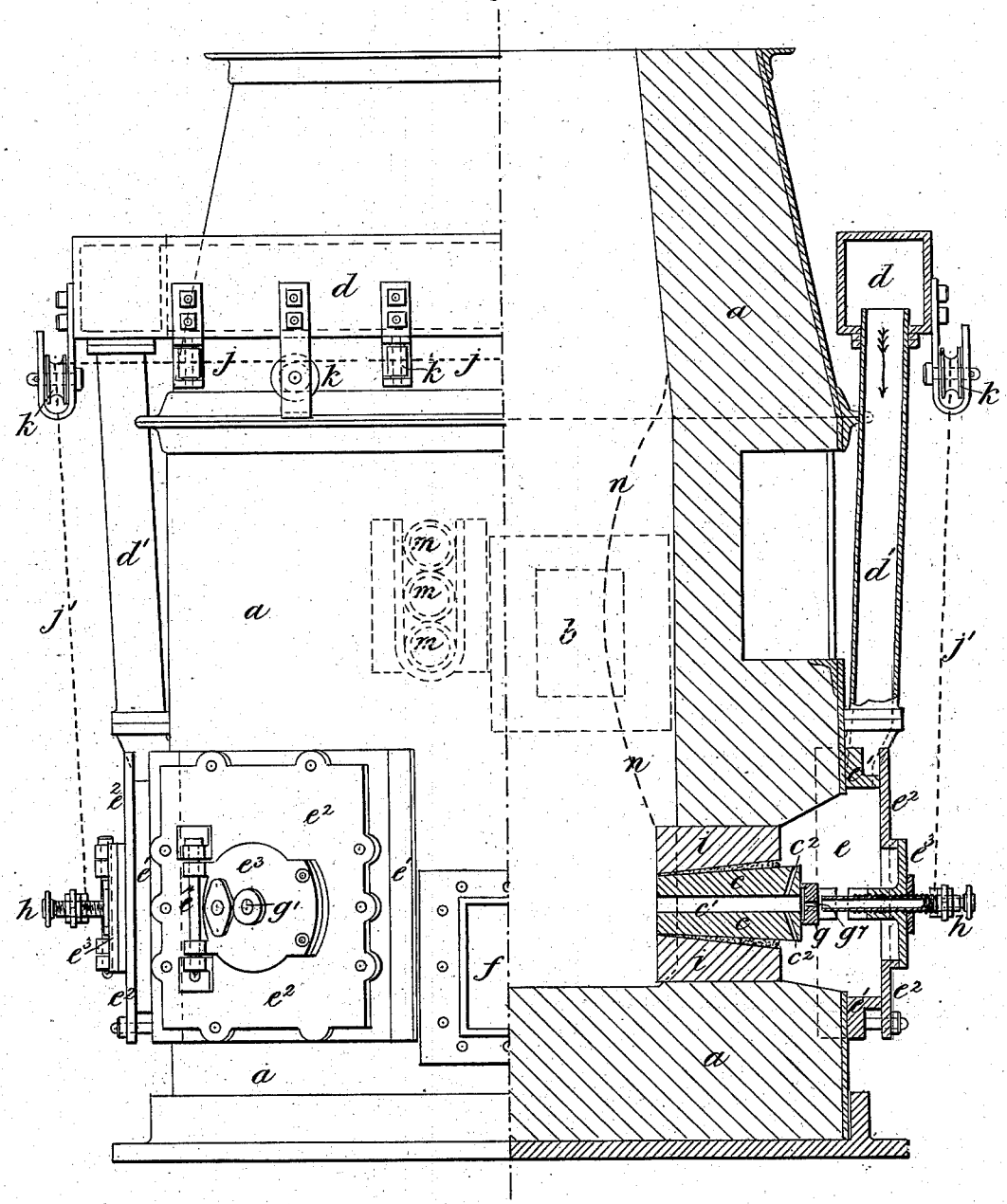
Figure 3:
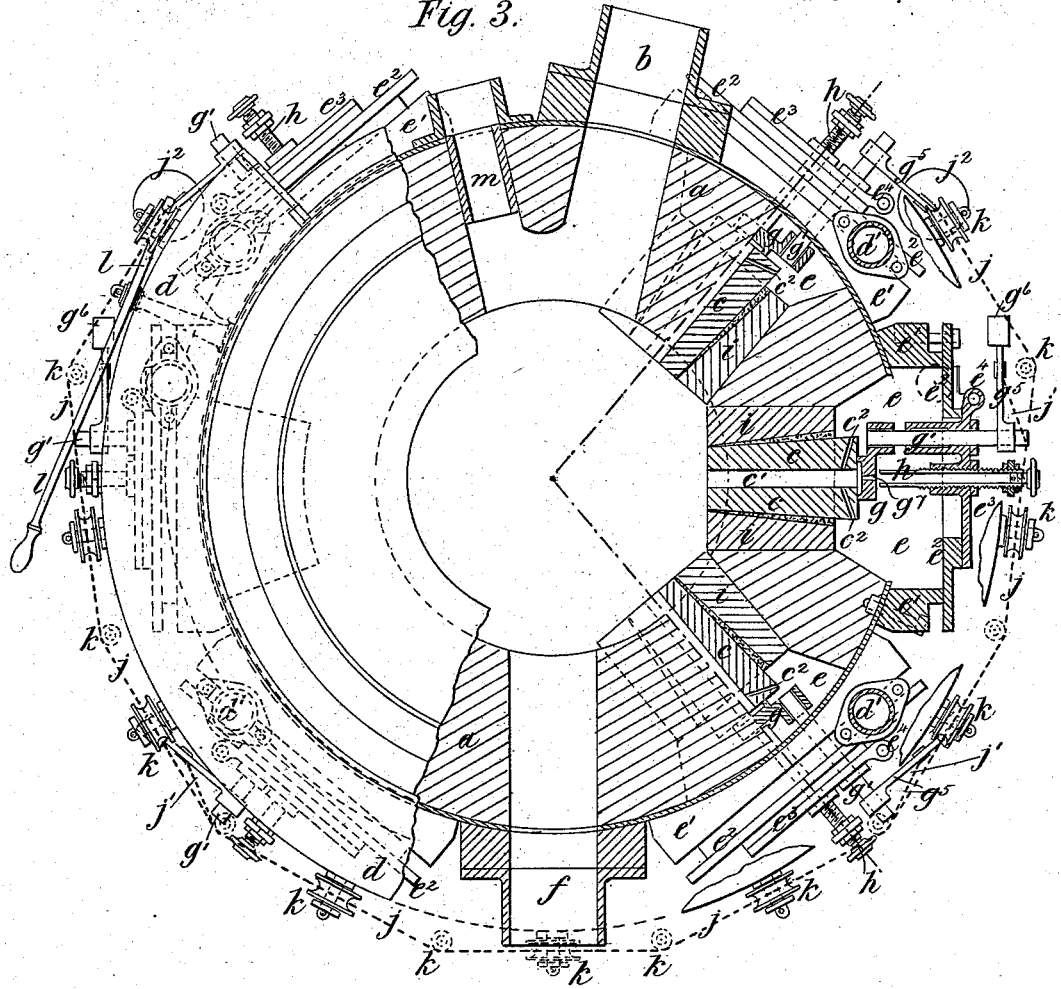
Figure 4:
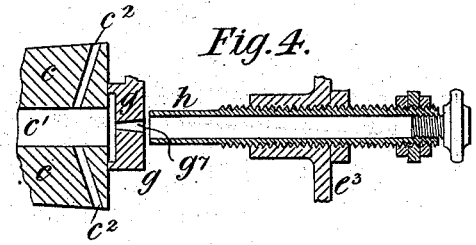
Figure 5:
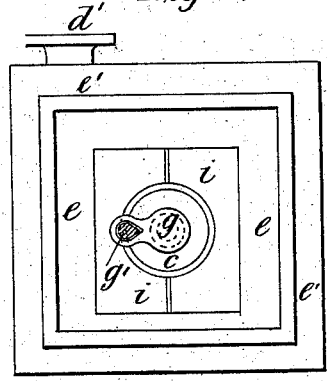

In the drawings, Figure 1 is an elevation. Fig. 2 is partly an elevation and partly a vertical section. Fig. 3 is a plan, partly in section; and Figs. 4 and 5 are detail views of a converter with my present improvements applied thereto; and Figs. 6, 7, 8, 9, 10, 11, and 12 are views representing slight modifications of parts.

$a$ is the body of the converter. $b$ is the charging-aperture. $c$ are the tuyeres. $d$ is the main blast-pipe surrounding the upper part of the converter, and $d'$ are branch blast-pipes conveying the blast to the blast boxes or chambers $e$, and $f$ is the discharge-aperture.

The parts above described, excepting the tuyeres $c$, form no part of my present invention.

Figure 8:
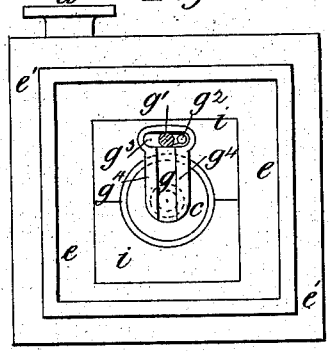
Figure 9:
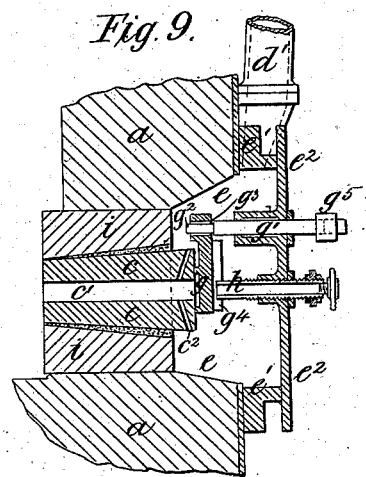

In carrying my present invention into effect I employ at the rear end of each tuyere $c$ a sliding valve or cover, $g$, fitting against the end of the tuyere, which valve $g$ may, as applied to Figs. 1, 2, 3, 4, 5, 6, and 7, be mounted on an axis of motion, $g'$, so as to move in a circular path; or it may, as shown at Figs. 8 and 9, be caused to move in a right line by means of a crank, $g^2$, fixed on the axis $g'$, and working in a slot, $g^3$, in the valve or cover $g$, suitable guides, $g^4$, being formed on the back of the valve $g$ to act in combination with the sight-tube $h$, and thereby control the motion of the valve $g$. Each of these sliding valves or covers $g$ works within a blast box or chamber, $e$, formed on the outside of the converter, and the flanges or side frames, $e'$, of said blast box or chamber $e$ are made large enough to be fixed around the margin of a large hole which I form in the converter-shell, so that by removing the cover $e^2$ of the said blast box or chamber $e$ from the converter a passage is left sufficiently large to enable the block or blocks $i$, receiving the tuyeres $c$, to be removed and received from the exterior of the converter, while by removing a smaller cover, $e^3$, carried by the cover $e^2$, by turning it back on its hinge-joint $e^4$, or in other suitable way, a passage is left sufficiently large to enable the tuyeres $c$ to be renewed.

The valves or covers $g$ for opening and closing the passages through the tuyeres are each operated by a shaft, $g'$, which has fixed thereon a lever, $g^5$, and the several levers $g^5$ are connected by short chains $j'$ to a chain, $j$, passing around the converter over suitable guide-wheels, $k$. Each end of the chain $j$ has fixed thereto a weight, $j^2$, and a lever, $l$, is connected to the chain $j$, so that by raising the short end of said lever $l$, one of the weights $j^2$ is caused to pull the chain $j$ in one direction, thereby simultaneously acting upon all the valves $g$, so as to open the passages through the tuyeres $c$, while by lowering the short end of the lever $l$ the valves $g$ are caused to act in the contrary direction by weights $g^6$, (see Fig. 1,) fixed on the levers $g^5$, operating the same. Other means may, however, be employed for simultaneously operating these valves $g$.

The small chains $j'$, above referred to, are hooked to the large chain $j$, so as to afford facility for closing any single tuyere by simply unhooking the small chain $j'$, connected therewith, when the weight $g^6$ will close the valve $g$.

I make the tuyere $c$ somewhat longer than the block or blocks $i$, receiving the same, and I make such block or blocks $i$ somewhat short of the outer shell of the converter, in order to leave an air-space between the said parts, by which means, in the event of the joints becoming imperfect, the blast, by penetrating such joints, will keep the molten metal out of the same. The blast boxes or chambers $e$ are connected with the main blast-pipe $d$ by the branch pipes $d'$, as shown.

I form the tuyeres $c$, as heretofore, with passages $c'$, passing directly through the same; but according to my present invention I also form small lateral openings $c^2$ in the same, near the outer ends thereof, and communicating with the central passage, $c'$, so as to permit a small blast to pass into the tuyeres when the main blast is shut off by means of the valves $g$. The valves $g$ are formed with a small hole, $g^7$, through the center thereof, to enable a small stream of blast to enter the tuyere to keep the metal fluid therein when the valve or cover $g$ is over the end of the same. In this case the lateral holes $c^2$ in the tuyere would be unnecessary.

At the back of each tuyere $c$, I form a tapped opening in the cover $e^2$ or $e^3$ of each blast box or chamber $e$, and I screw therein a tube, $h$, through which a view can, when required, be obtained of the tuyere, and said tube $h$ can also be used, if required, for forcing the valve $g$ against the end of the tuyere $c$. I also, in lieu of removing the cinder through the charging-aperture $b$, provide two or more small holes, $m$, at different levels, so as to enable the cinder to be removed from time to time at different levels as may be required without removing the plug or stopper from the charging-aperture $b$.

Figure 6:
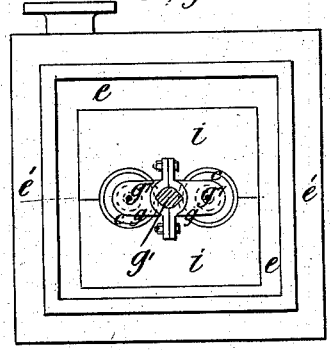
Figure 7:
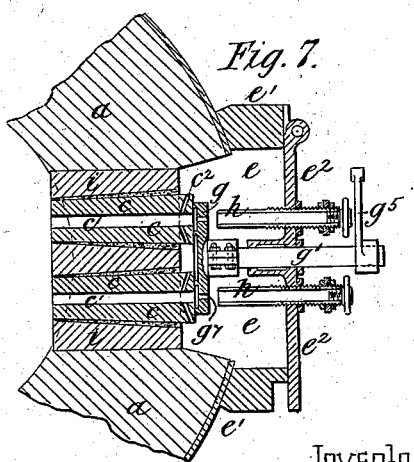

At Figs. 6 and 7 I have represented each block or pair of blocks $i$ provided with two tuyeres $c$, set side by side, in which case the shaft or axis $g'$ is placed between the two tuyeres, and a valve $g$ projects from each side thereof, the means for operating said shaft $g'$ and valves $g$ being as before described.

In the arrangement shown at Figs. 6, 7, 8, and 9, I have dispensed with the small cover $e^3$ and use only the large cover $e^2$.

Figure 10:
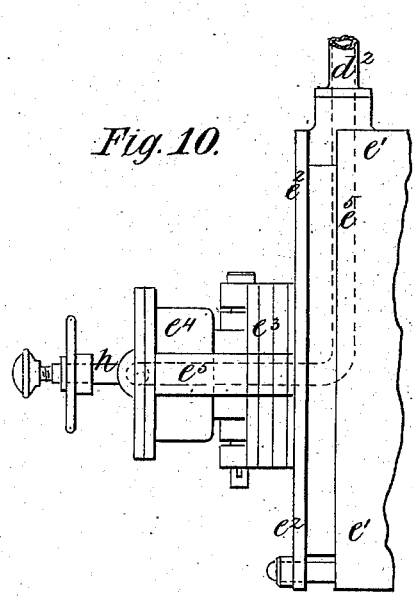
Figure 11:
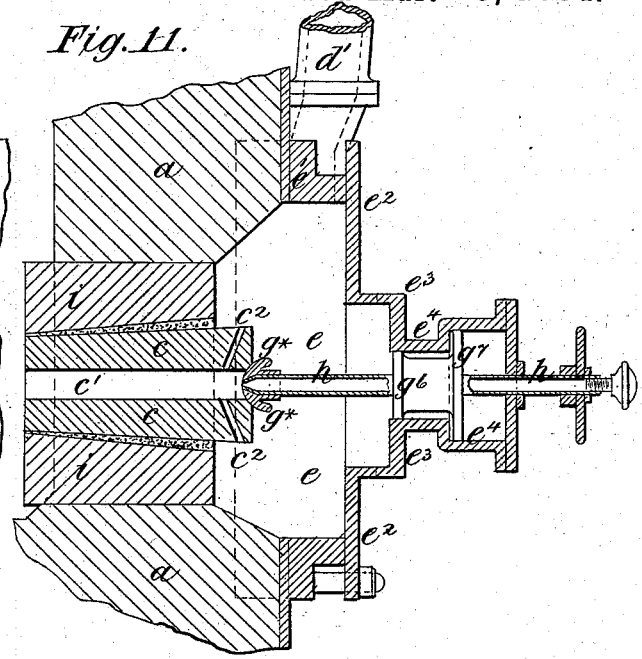
Figure 12:
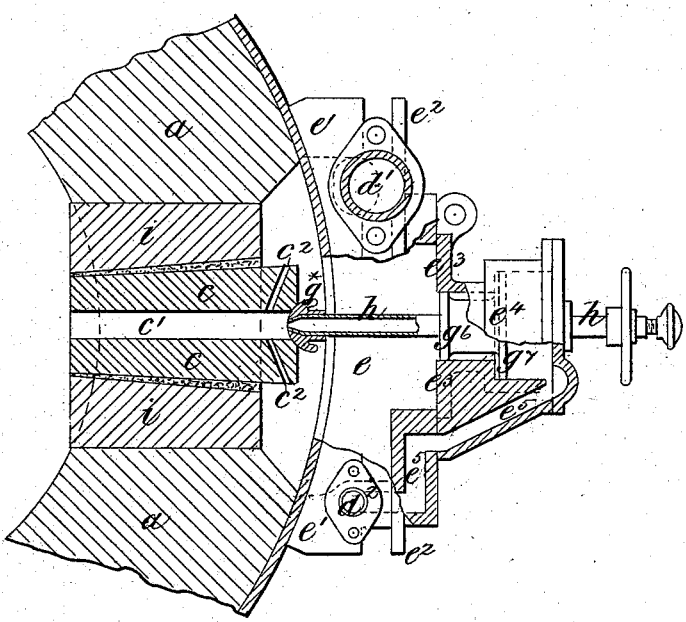

At Figs. 10, 11, and 12 I have represented, respectively, an elevation, a vertical section, and a horizontal section of parts, showing my improved method of facilitating the repair and renewal of the tuyeres $c$ and blocks $i$ applied to a converter, in which a plug or stopper,$g^*$, is employed to close the passage through the tuyere $c$. In this case the cover $e^3$ has formed therein or connected thereto a double cylinder, $e^4$, provided with a small and a large bore to receive two pistons, $g^6 g^7$, through which the sight-tube $h$, which carries the plug or stopper $g^*$, is screwed. The blast led into the box or chamber $e$ by the pipe $d'$ acts upon the small piston $g^6$, and a blast-pipe, $d^2$, and passage $e^5$ lead the blast to the back of the large piston $g^7$. Thus when blast is shut off from the passage $e^5$ the blast in the chamber $e$ acts upon the small piston $g^6$, and thereby removes the plug $g^*$ from its seat and opens the passage through the tuyere, but when blast is admitted into the passage $e^5$ it acts upon the large piston $g^7$, and by reason of the increased area thereof forces the plug $g^*$ to its seat, and thereby closes the passage through the tuyere.

By removing the cover $e^3$, with the double cylinder $e^4$, from the chamber $e$, access is afforded to the tuyere $c$ for repairs or renewals, and by removing the cover $e^2$ sufficient opening is obtained for repairs or renewals of the blocks $i$, as before described.

If desired, the converter can be lined to the form shown by the dotted line $n$ in Fig. 2.

Having thus described the nature of my said invention and the mode in which I carry the same into effect, I would have it understood that what I claim is—

1. The combination, in a converter having tuyeres and air-chambers arranged at the outer end of the tuyeres, of laterally-sliding valves or covers for opening and closing the tuyeres, having axes extending through the side or cover of the wind-boxes, with actuating mechanism connected to the several axes for turning the same to cause the simultaneous operation of the valves, substantially as and for the purpose described.

2. The combination, with a converter having tuyeres and external air-chambers, of sliding valve or cover $g$, axis $g'$, lever $g^5$, chains $j j$, weights $j^2 g^6$, guide-rollers $k$, and lever $l$, substantially as herein shown and described, and for the purpose stated.

3. The combination, in a converter having tuyeres and external air-chambers surrounding the tuyeres, of a laterally-sliding valve for closing the tuyeres, and an independent axially-moving stem extending through the cover or side of the air-chamber for forcing and holding the valve tightly to its seat, substantially as and for the purposes set forth.

4. The combination in a converter, having tuyeres and external air-chambers, of the tuyere and its perforated valve, with a sight-tube extending through the door or side of the air-chamber, substantially as and for the purposes described.

5. The combination of the tuyere and its perforated sliding valve with a screwed sight-tube constructed to force the valve to its seat, substantially as and for the purposes described.

6. The combination, in a converter, of the tuyere-blocks $i$, tuyeres $c$, of greater length than the blocks, and provided with lateral openings connecting with the air or blast chambers $e$, and valves situated in the chamber for closing the tuyeres, substantially as and for the purposes described.

7. The combination, in a converter having tuyeres and external air-chambers, of a laterally-sliding valve arranged in the air-chambers for closing the tuyeres, each having an axis, with a weighted radial lever connected to the axis for turning it to open the valve, and means for closing the valves simultaneously, substantially as and for the purposes described.

THOS. GRIFFITHS.

Witnesses:
  EDWIN FOSTER,
    *Architect, Abergavenny.*
  ALFRED SEARGEANT,
    *Stationer, Abergavenny.*